(12) United States Patent
Fujiwara et al.

(10) Patent No.: US 12,518,063 B2
(45) Date of Patent: Jan. 6, 2026

(54) COMPUTER SYSTEM AND INFORMATION PROCESSING METHOD

(71) Applicant: Hitachi, Ltd., Tokyo (JP)

(72) Inventors: Keisei Fujiwara, Tokyo (JP); Hisayoshi Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/704,189

(22) PCT Filed: Nov. 4, 2022

(86) PCT No.: PCT/JP2022/041098
§ 371 (c)(1),
(2) Date: Apr. 24, 2024

(87) PCT Pub. No.: WO2023/085196
PCT Pub. Date: May 19, 2023

(65) Prior Publication Data
US 2024/0419845 A1    Dec. 19, 2024

(30) Foreign Application Priority Data

Nov. 9, 2021    (JP) .................................. 2021-182743

(51) Int. Cl.
*G06F 21/74*    (2013.01)
*G06F 21/60*    (2013.01)

(52) U.S. Cl.
CPC ............ *G06F 21/74* (2013.01); *G06F 21/602* (2013.01); *G06F 2221/2149* (2013.01)

(58) Field of Classification Search
CPC ...................................................... G06F 21/74
See application file for complete search history.

(56) References Cited

U.S. PATENT DOCUMENTS

| | | | | |
|---|---|---|---|---|
| 6,292,899 B1 * | 9/2001 | McBride | ................ | G06F 21/79 713/193 |
| 11,475,121 B2 * | 10/2022 | Fujiwara | ................ | G06F 21/74 |
| 2021/0125051 A1 | 4/2021 | Linton et al. | | |
| 2024/0296245 A1 * | 9/2024 | Choi | ..................... | G06F 21/602 |
| 2024/0419609 A1 * | 12/2024 | Zhang | ..................... | G06F 21/78 |

* cited by examiner

*Primary Examiner* — Simon P Kanaan
(74) *Attorney, Agent, or Firm* — PROCOPIO, CORY, HARGREAVES & SAVITCH LLP

(57) ABSTRACT

This computer system comprises a computer having a processor that has a function for setting a confidence region in a memory, the confidence region having ensured security and being logically isolated. The computer system accepts a request for execution of processing on encrypted data, in which data is encrypted that includes a plurality of block processes and also includes confidential information, determines whether the encrypted data needs to be decrypted when executing one block process, and executes the block process using a region that is different from the confidence region when the encrypted data does not need to be decrypted, or executes the block process using the confidence region when the encrypted data needs to be decrypted.

15 Claims, 10 Drawing Sheets

[FIG. 1]
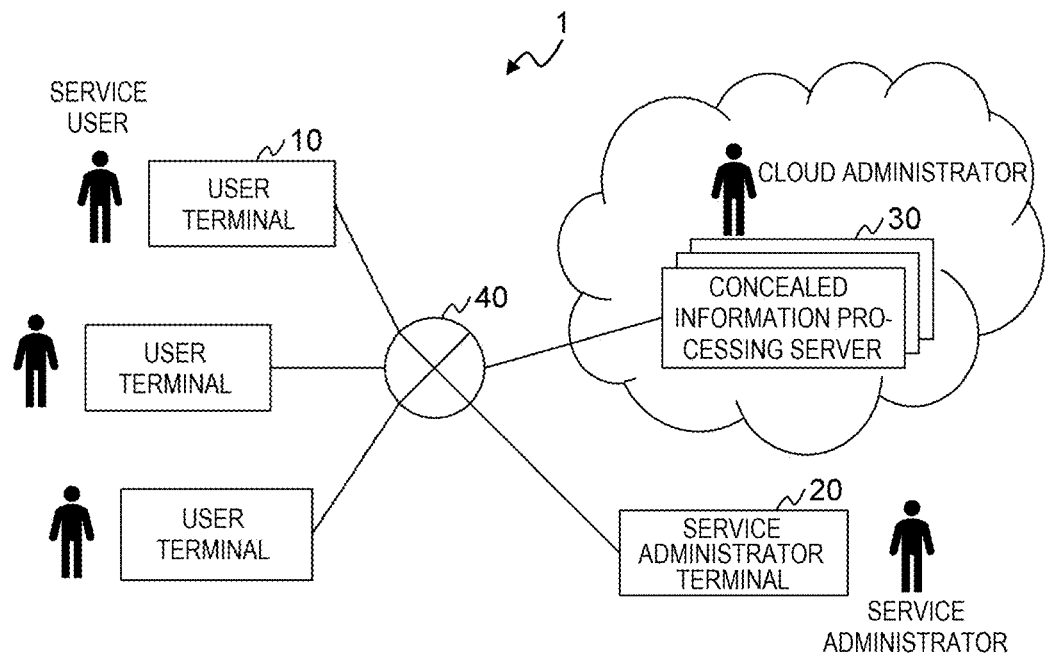

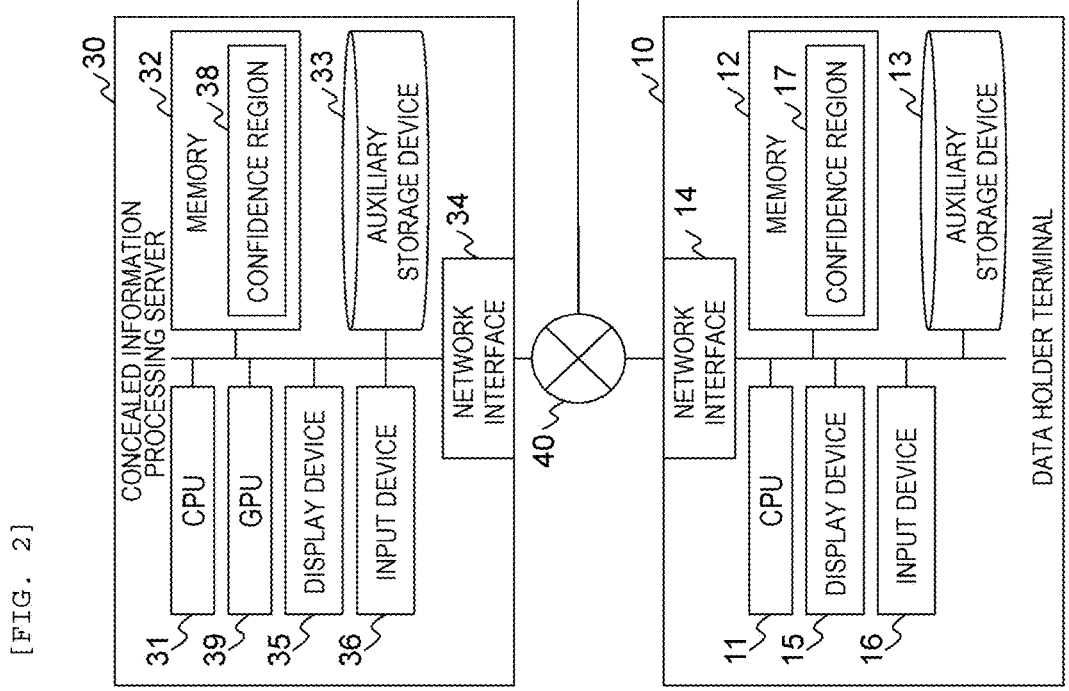
[FIG. 2]

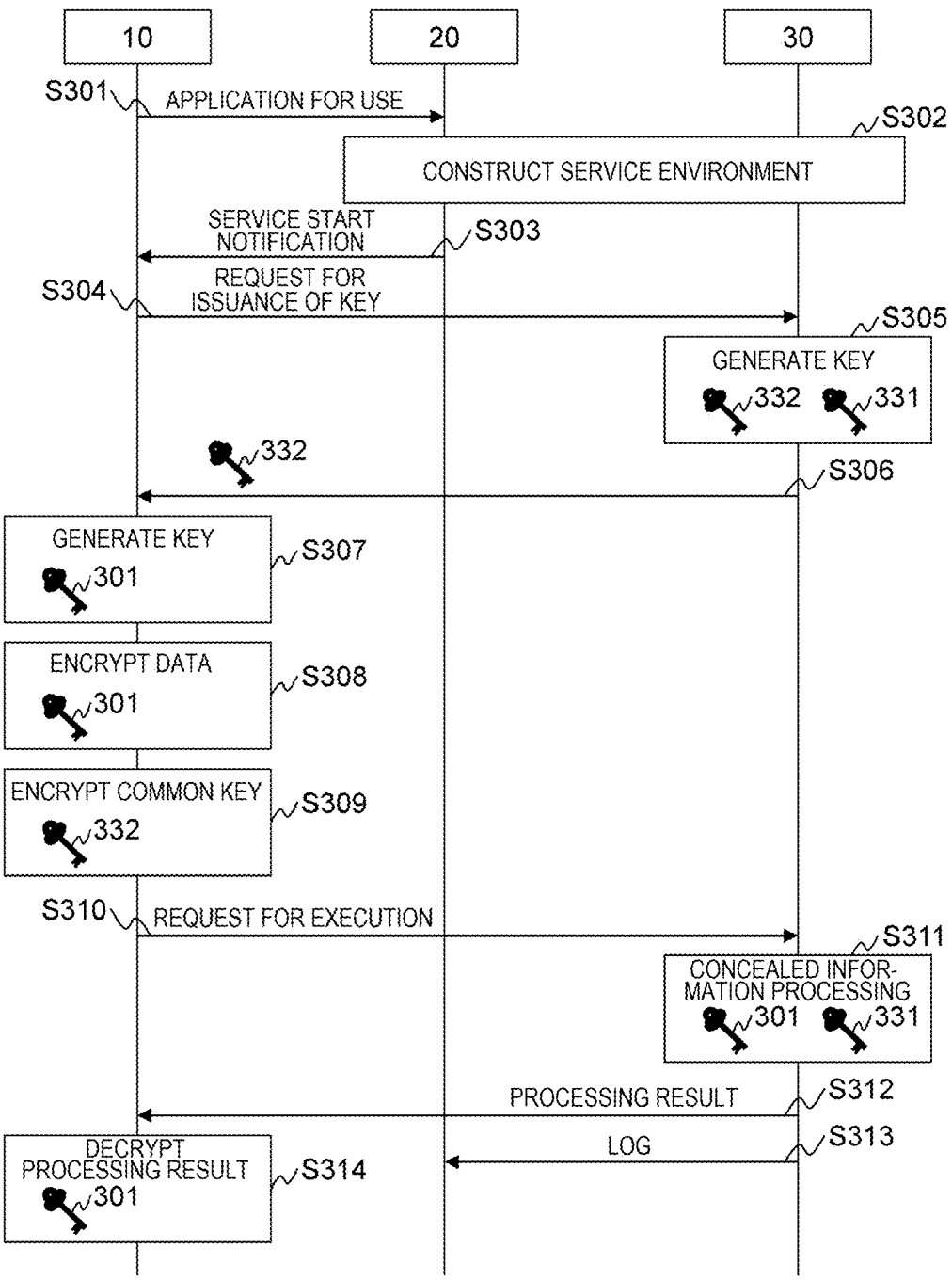

[FIG. 4]
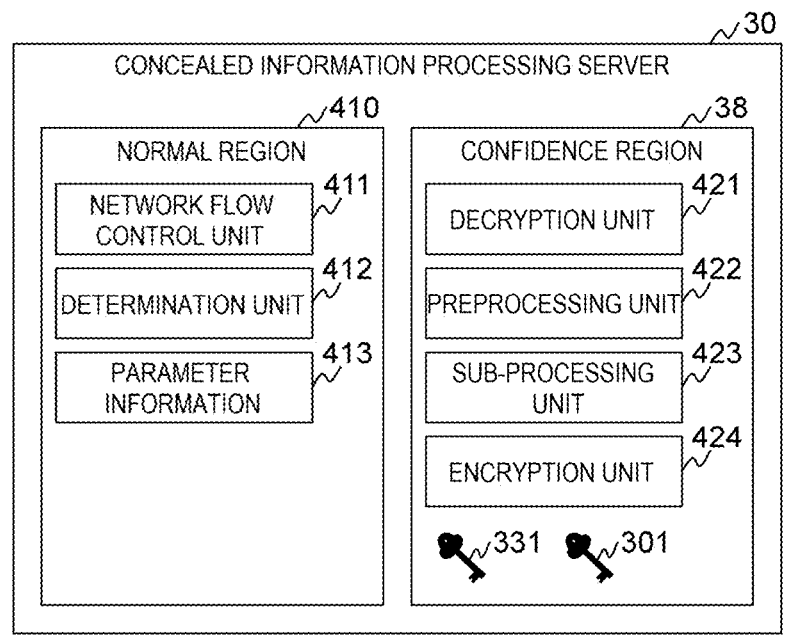

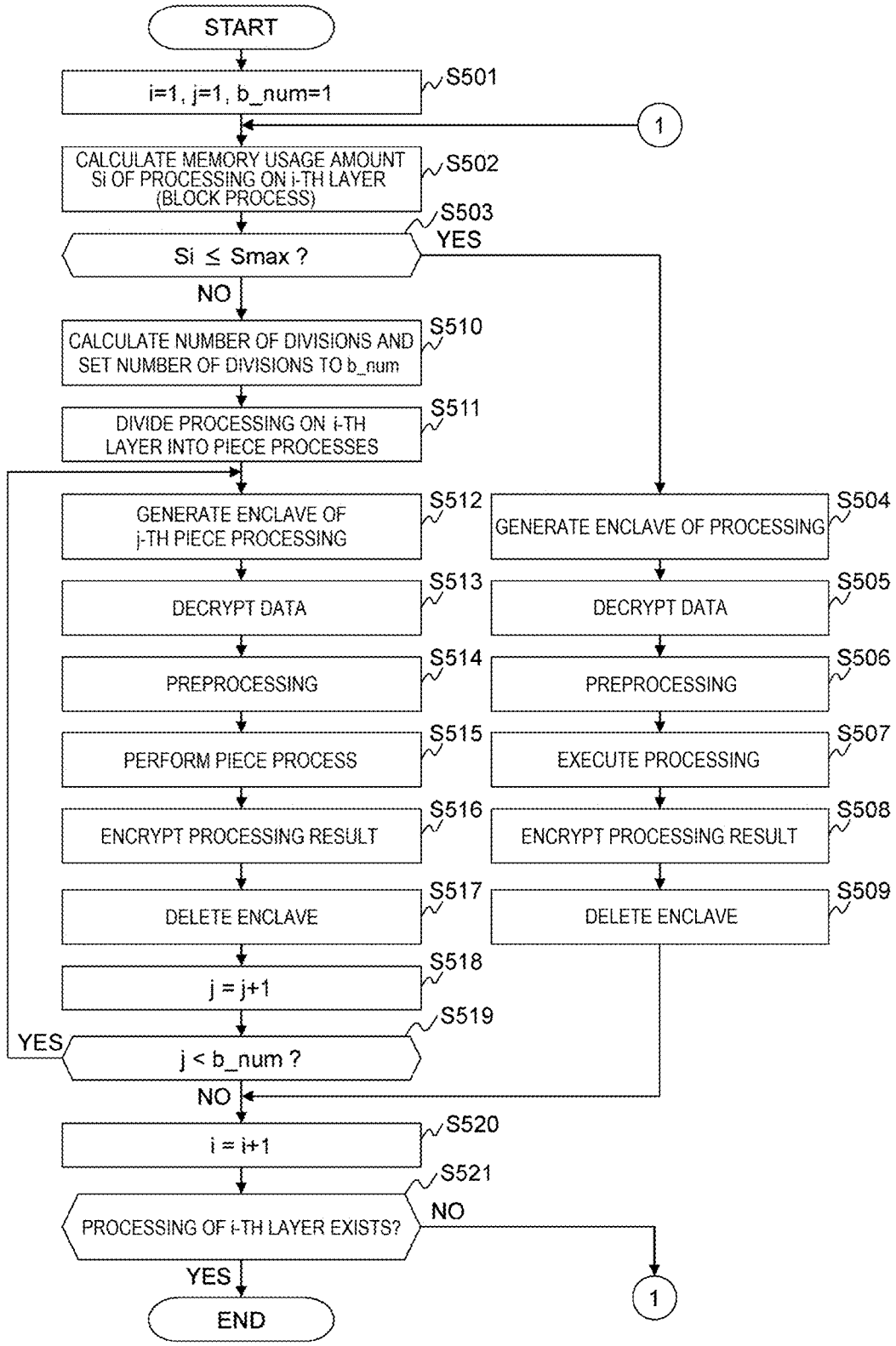
[FIG. 5]

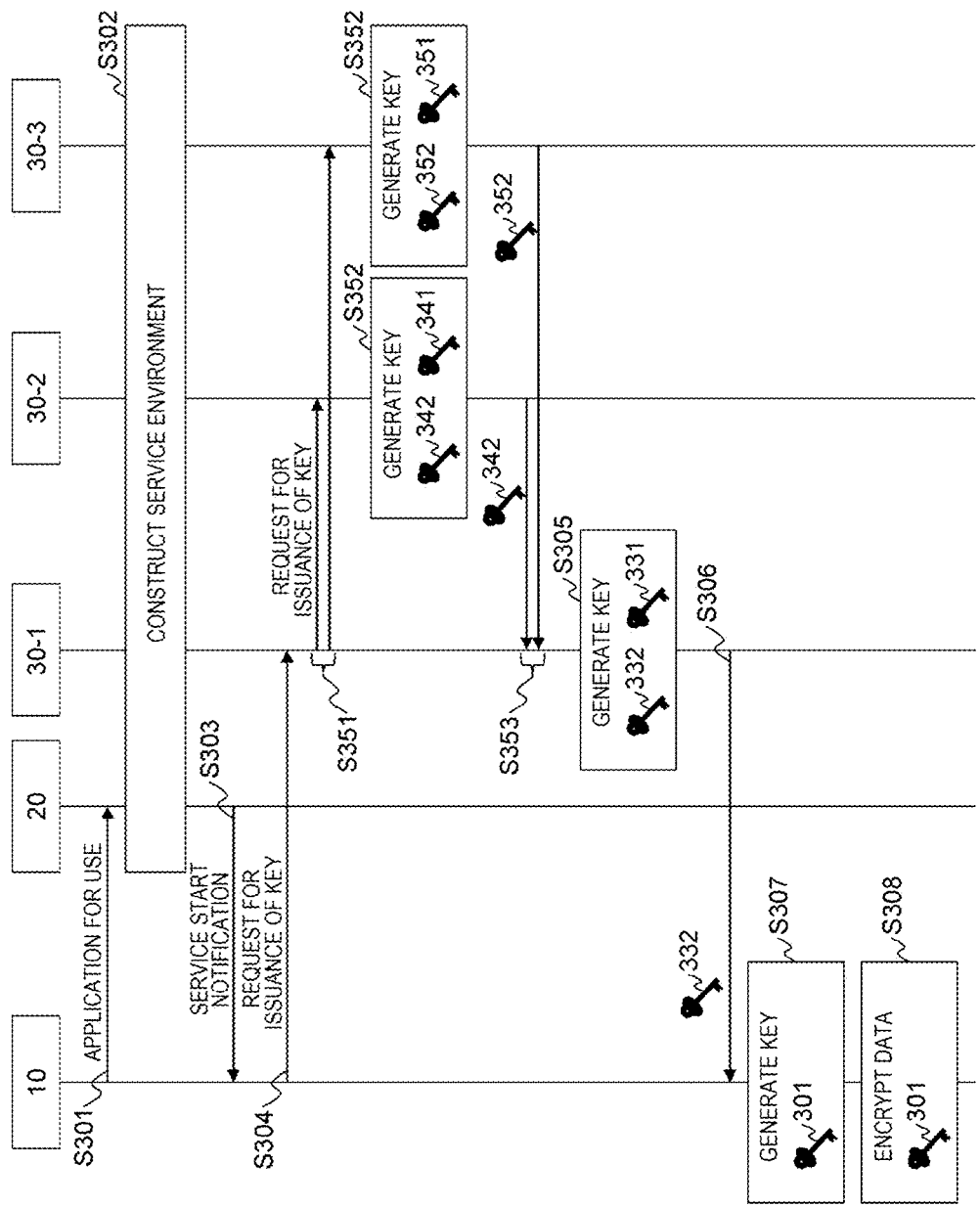

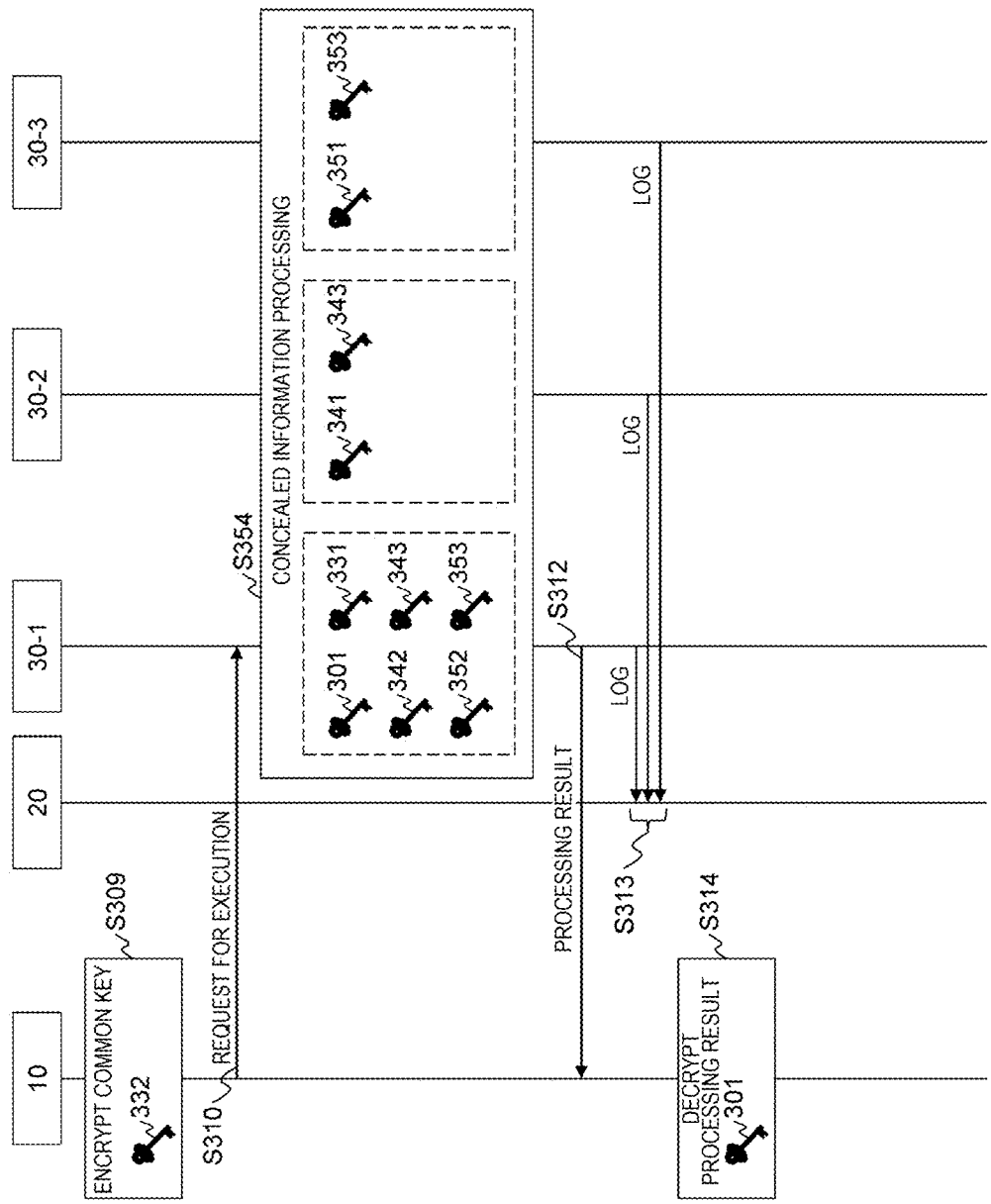

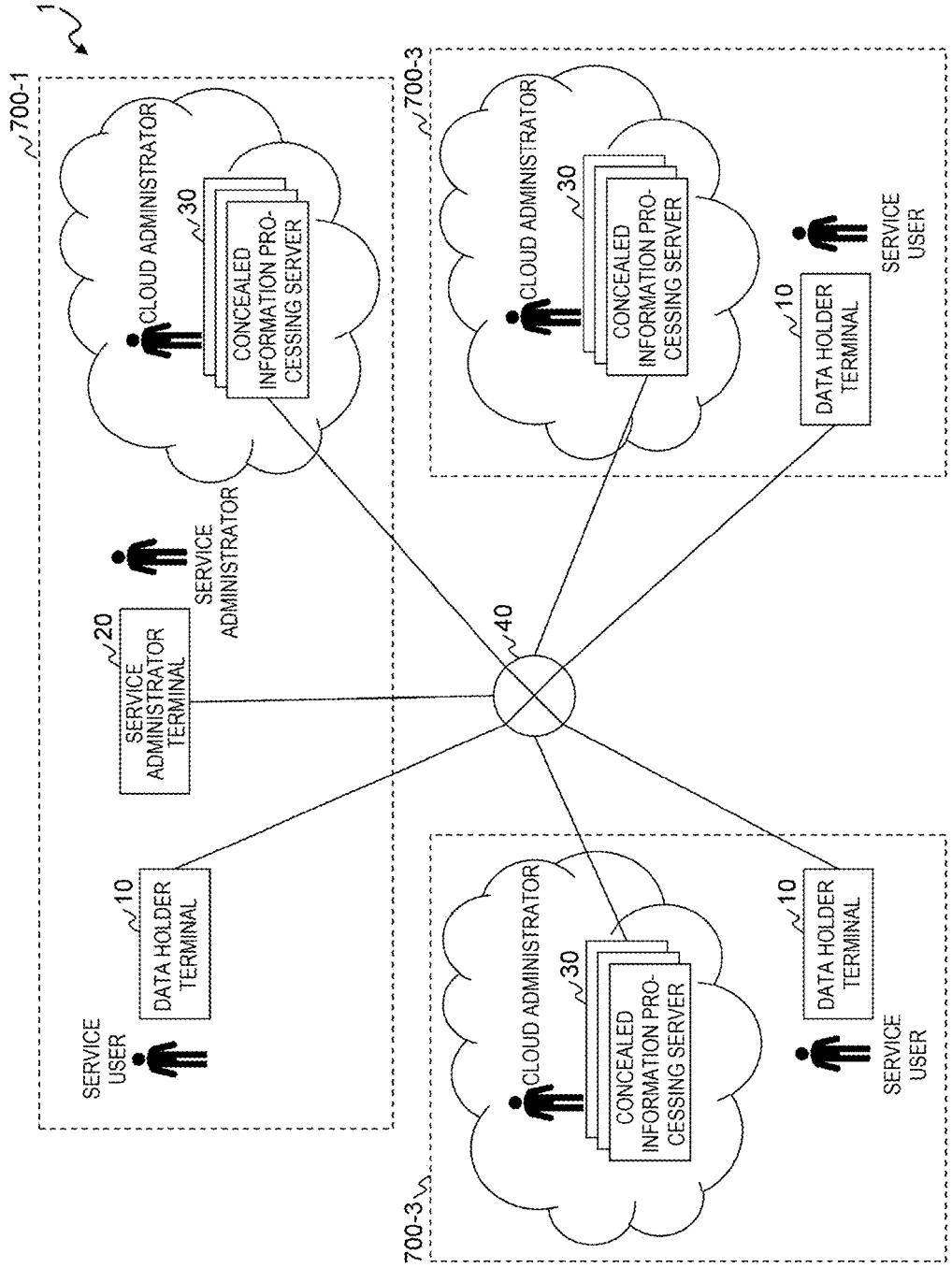
[FIG. 7]

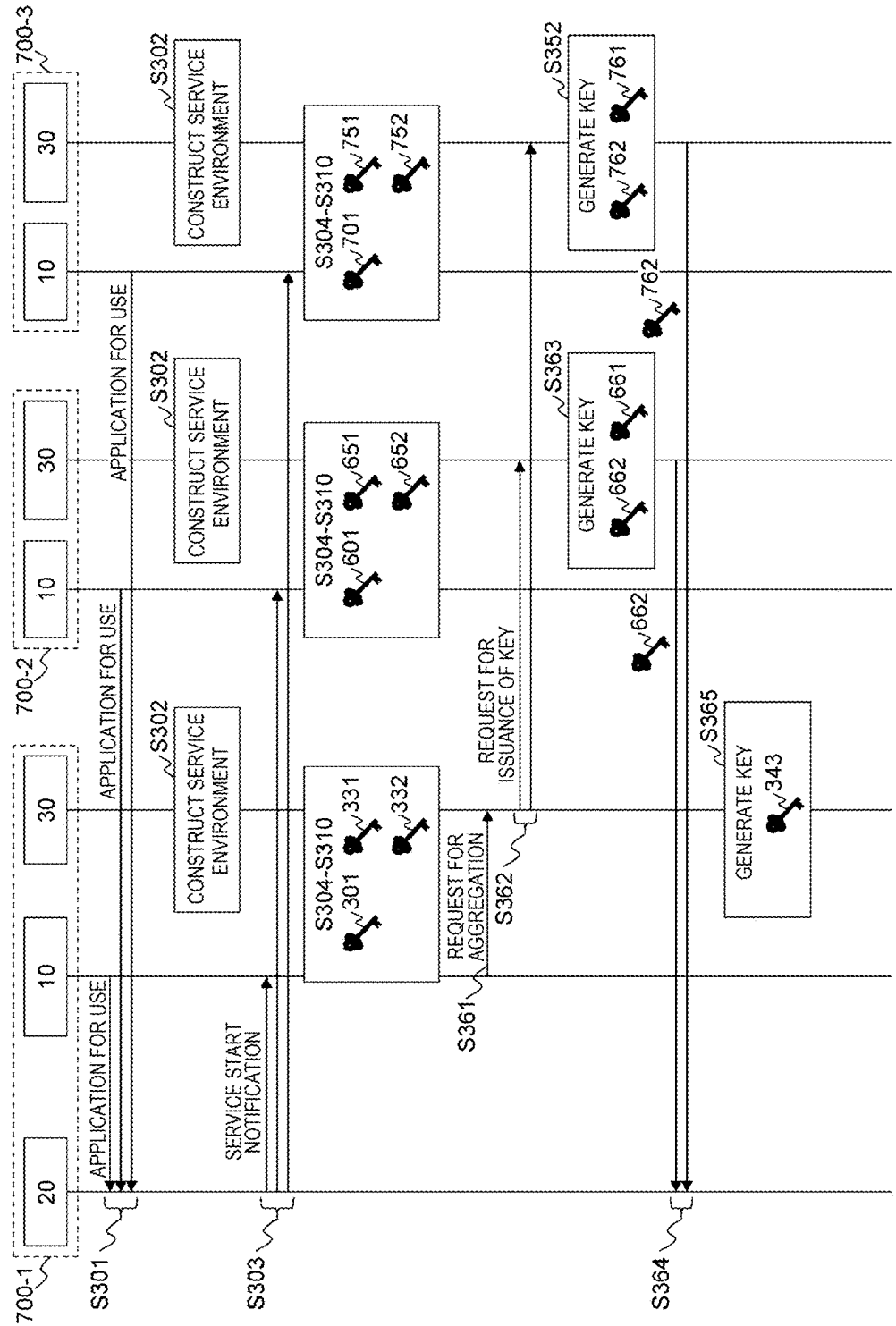

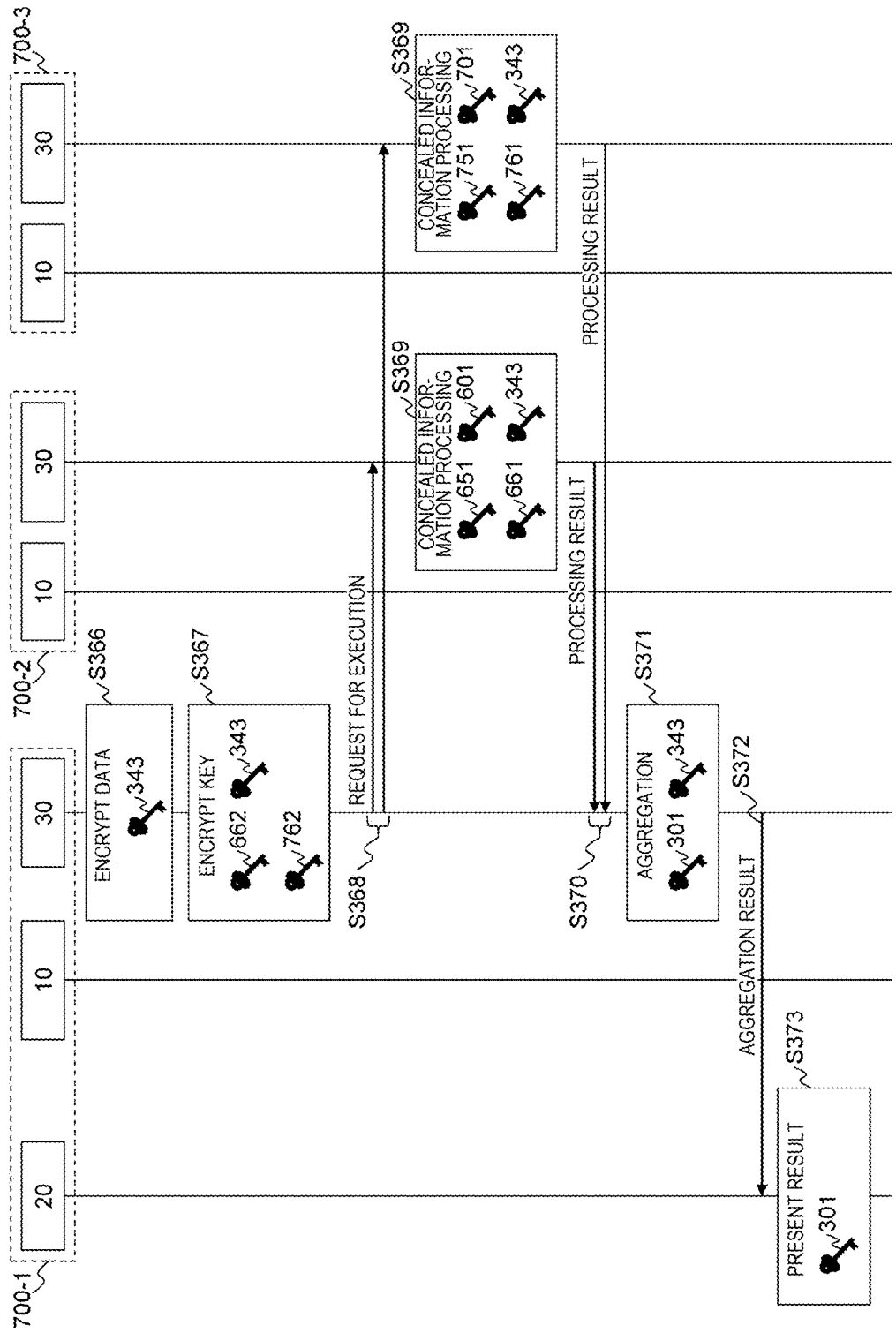

COMPUTER SYSTEM AND INFORMATION PROCESSING METHOD

INCORPORATED BY REFERENCE

This application claims priority from Japanese Patent Application No. 2021-182743 filed on Nov. 9, 2021, and the subject matter of which is incorporated herein by reference.

TECHNICAL FIELD

The present invention relates to a system for processing confidential information such as personal information in a concealed state, and an information processing method thereof.

BACKGROUND ART

In recent years, utilization schemes of personal data involving cooperation of the government and the people have progressed. This have created new values, for example, cooperation of various information, such as cooperation between public services and private services. In order to create the new values of cooperation of various information, it is regarded as effective to employ statistical analysis such as regression analysis and machine learning such as convolutional neural network (CNN). Statistical analysis and machine learning are also provided with infrastructure that can be easily performed by various companies using a public cloud or the like that can be used at low cost.

On the other hand, regulation enhancement for the purpose of privacy protection has also progressed. Accordingly, there is a demand for a technique of using confidential information owned by data holders such as hospitals, banks, or the like in a concealed state.

The related art enables specific processing while keeping the data encrypted, thereby implementing the utilization of confidential information in a concealed state. However, the processing that can be executed in the related art is limited to basic processing such as search and order comparison, and is limited in the degree of freedom of the processing. Therefore, there is a demand for a technique capable of coping with advanced statistical processing and image processing using machine learning such as convolutional neural network (CNN), which are regarded as requiring a high degree of freedom of processing.

In recent years, central processing units (CPUs) are equipped with a trusted execution environment (TEE) function. The TEE function is considered to be effective for processing concealed information. The TEE function is a function of providing a confidence region in which the information cannot be read even if the administrator authority of the OS running on the computer is hijacked. By decrypting and processing the encrypted data in the confidence region, secure and advanced processing can be performed.

Techniques of using a confidence region of a TEE function for machine learning include a technique described in PTL 1. PTL 1 discloses a method for concealed transfer learning using an execution environment in which TEE is trusted (confidence region).

The technique described in PTL 1 relates to a secure portable deep neural network (DNN) for concealed transfer learning, and is disclosed for a concealed transfer learning method. The method includes generating a machine learning model including a training application programming interface (API) and an inference API. The method further includes encrypting the machine learning model using a predetermined encryption mechanism. The method further includes copying the encrypted machine learning model to the TEE. The method also includes executing the machine learning model of TEE using the inference API.

CITATION LIST

Patent Literature

PTL 1: U.S. Patent Application Publication No. 2021/0125051

SUMMARY OF INVENTION

Technical Problem

However, in the method described in PTL 1, when the memory usage required for the machine learning model, the machine learning application, and the input/output data thereof is larger than the capacity of the confidence region, the processing time increases due to the occurrence of a paging process, in which data that cannot be fitted in the confidence region is written to the outside and is read again when necessary. For example, when the amount of parameters of the machine learning model is about 140 MB and the amount of the machine learning application for executing the machine learning model is about 150 MB while the capacity of the confidence region is about 100 MB, a paging process occurs because the memory usage necessary for the machine learning application to execute the machine learning model is larger than the capacity of the confidence region.

In view of the above, an object of an aspect of the present invention is to, in concealed information processing using a TEE function, prevent the occurrence of a paging process and speed up the process when the memory usage required for execution exceeds the capacity of a confidence region.

Solution to Problem

In order to solve the above problems, one aspect of the invention adopts the following configuration. A computer system includes at least one computer. The at least one computer has a processor, a memory connected to the processor, and a network interface connected to the processor. The processor has a function for setting a confidence region in a memory, the confidence region having ensured security and being logically isolated. The at least one computer accepts a request for execution of processing on encrypted data, in which data is encrypted that includes a plurality of block processes and also includes confidential information, determines whether the encrypted data needs to be decrypted in one of the block processes when executing the block process, and executes the block process using a region that is different from the confidence region when the encrypted data does not need to be decrypted in the block process, or executes the block process using the confidence region when the encrypted data needs to be decrypted in the block process.

Advantageous Effects of Invention

According to the one aspect of the present invention, it is possible to prevent the occurrence of a paging process and implement high-speed concealed information processing using a TEE function. Problems, configurations, and effects other than those described above will become apparent by description of the following embodiments.

BRIEF DESCRIPTION OF DRAWINGS

FIG. 1 is a block diagram illustrating a configuration example of a concealed information processing system according to Embodiment 1.

FIG. 2 is a block diagram illustrating a hardware configuration example of the concealed information processing system.

FIG. 3 is a sequence diagram illustrating an example of a flow of providing a concealed information processing service in the concealed information processing system according to Embodiment 1.

FIG. 4 is a block diagram illustrating an example of a functional configuration of the concealed information processing server according to Embodiment 1.

FIG. 5 is a flowchart illustrating an example of concealed information processing executed by the concealed information processing server according to Embodiment 1.

FIG. 6A is a sequence diagram illustrating an example of a flow of providing a concealed information processing service in a concealed information processing system according to Embodiment 2.

FIG. 6B is a sequence diagram illustrating an example of a flow of providing the concealed information processing service in the concealed information processing system according to Embodiment 2.

FIG. 7 is a block diagram illustrating a system configuration example of a concealed information processing service according to Embodiment 3.

FIG. 8A is a sequence diagram illustrating an example of a flow of providing a concealed information processing service in the concealed information processing system according to Embodiment 3.

FIG. 8B is a sequence diagram illustrating an example of a flow of providing the concealed information processing service in the concealed information processing system according to Embodiment 3.

DESCRIPTION OF EMBODIMENTS

Hereinafter, embodiments of the invention will be described with reference to the drawings. However, the invention is not to be construed as being limited to the description of the following embodiments. It will be easily understood by those skilled in the art that the specific configuration can be changed without departing from the spirit or scope of the invention.

In the configurations of the invention described below, the same or similar configurations or functions are denoted by the same reference signs, and a redundant description thereof will be omitted.

Notations "first", "second", "third", and the like in the present specification and the like are provided to identify components, and do not necessarily limit the number or the order of those components.

Embodiment 1

(1-1) Configuration Example of Concealed Information Processing System

FIG. 1 is a block diagram illustrating a configuration example of a concealed information processing system according to Embodiment 1. The concealed information processing system 1 receives data including encrypted confidential information from a service user (data holder) holding confidential information such as personal information and company secrets, processes the received data while keeping the confidential information concealed from the outside, and provides the result of the processing to the service user, where the outside is a concept including cloud administrators and service administrators.

The concealed information processing system 1 includes, for example, a user terminal 10, a concealed information processing server 30, and a service administrator terminal 20. The user terminal 10, the concealed information processing server 30, and the service administrator terminal 20 are connected to each other via a network 40 such as the Internet, where the network 40 is implemented with the Internet via wired communication or wireless communication, an intranet such as an in-house network, or a communication network such as a satellite line.

The user terminal 10 is a terminal used by a service user that uses a service or a data holder that provides data. The service user and the data holder may be the same. The data holder encrypts data using the user terminal 10 and transmits the encrypted data to the concealed information processing server 30. The service user uses the user terminal 10 to transmit an application for use of the service and a request for execution of the process. The service administrator terminal 20 is a terminal used by a service administrator that provides the concealed information processing service. The service administrator uses the service administrator terminal 20 to accept the application for use of the concealed information processing service from the service user, and performs environment construction, operation, and management of the concealed information processing server 30. When receiving the request for execution of processing using data received from the service user, the concealed information processing server 30 executes the processing while keeping the data concealed from the outside, and transmits the result of the processing to the service user.

The concealed information processing system 1 may include a plurality of user terminals 10, may include a plurality of service administrator terminals 20, and may include a plurality of concealed information processing servers 30. When the concealed information processing system 1 includes a plurality of user terminals 10, the user terminal 10 for transmitting the confidential information and the user terminal 10 for using the result of the processing may be separated.

FIG. 2 is a block diagram illustrating a hardware configuration example of the concealed information processing system 1. The hardware configuration of each of the user terminal 10, the service administrator terminal 20, and the concealed information processing server 30 will be described with reference to FIG. 2.

The user terminal 10 is, for example, a computer such as a personal computer, a smartphone, or a server device. The user terminal 10 includes, for example, a control processing unit (CPU) 11, a memory 12, an auxiliary storage device 13, a network interface 14, a display device 15, and an input device 16 that are connected to each other via an internal communication line.

The CPU 11 is an example of an arithmetic device and executes a program stored in the memory 12. The memory 12 includes a read only memory (ROM), which is a non-volatile storage element, and a random access memory (RAM), which is a volatile storage element. The ROM stores an immutable program (for example, basic input/output system (BIOS)) and the like. The RAM is a high-speed volatile storage element such as a dynamic random access memory (DRAM) and temporarily stores a program to be executed by the CPU 11 and data used when the program is executed.

The CPU 11 of the present embodiment is a TEE-compatible CPU having a trusted execution environment (TEE) function. The CPU 11 uses the TEE function to generate, in the memory 12, a confidence region 17 that is a hardware storage region and is isolated from the other regions. It is assumed that the confidence region 17 has a smaller capacity (for example, 128 MB) than the entire storage region of the memory 12. When the memory usage necessary for executing the processing is larger than the capacity of the confidence region 17, the processing speed of the processing using the region is reduced due to the occurrence of a paging process.

The CPU 11 may not have the TEE function. The confidence region 17 may be generated at the time of execution of the processing or may be generated before the start of the processing. The capacity of the confidence region 17 may not be particularly limited.

The auxiliary storage device 13 is a large-capacity and non-volatile storage device such as a magnetic storage device (hard disk drive (HDD)) or a flash memory (solid state drive (SSD)), and stores a program to be executed by the CPU 11 and data used when the program is executed. That is, the program is read from the auxiliary storage device 13, loaded into the memory 12, and executed by the CPU 11.

The display device 15 is a device for outputting the execution result of the program in a format that can be visually recognized by the user, such as a display or a printer. The input device 16 is a device for accepting input from the user, such as a keyboard or a mouse. The network interface 14 controls communication with other devices according to a predetermined protocol. The network interface 14 may include, for example, a serial interface such as USB.

The program executed by the CPU 11 may be stored in advance in the non-volatile auxiliary storage device 13 which is a computer-readable non-transitory storage medium, or may be provided to the user terminal 10 via a network from a removable medium (CD-ROM, flash memory, or the like) which is a non-transitory storage medium or a non-transitory storage device of another device, and stored in the auxiliary storage device 13. Therefore, the user terminal 10 may have an interface that reads data from the removable medium. The same applies to the service administrator terminal 20 and the concealed information processing server 30.

The service administrator terminal 20 is, for example, a computer such as a personal computer, a smartphone, or a server device. The service administrator terminal 20 includes, for example, a CPU 21, a memory 22, an auxiliary storage device 23, a network interface 24, a display device 25, and an input device 26 that are connected to each other via an internal communication line.

The hardware configurations of the CPU 21, the memory 22, the auxiliary storage device 23, the network interface 24, the display device 25, and the input device 26 are the same as the hardware of the CPU 11, the memory 12, the auxiliary storage device 13, the network interface 14, the display device 15, and the input device 16, respectively. However, the CPU 21 does not need to have the TEE function.

The concealed information processing server 30 is, for example, a computer such as a personal computer, a smartphone, or a server device. The concealed information processing server 30 includes, for example, a CPU 31, a memory 32, an auxiliary storage device 33, a network interface 34, a display device 35, an input device 36, and a graphics processing unit (GPU) 39 that are connected to each other via an internal communication line such as a bus.

The hardware configurations of the CPU 31, the memory 32, the auxiliary storage device 33, the network interface 34, the display device 35, and the input device 36 are the same as the hardware of the CPU 11, the memory 12, the auxiliary storage device 13, the network interface 14, the display device 15, and the input device 16, respectively. However, the CPU 31 of the concealed information processing server 30 has a TEE function and can generate a confidence region 38 in the memory 32. The GPU 39 executes a program stored in the memory 32 at high speed by using an region different from the confidence region 38 (normal region) of the memory 32. The concealed information processing server 30 may not include the GPU 39.

In the present embodiment, the TEE function is used as the function for implementing processing in a secure region isolated on the memory, but another method may be employed as well.

A part or all of processes executed by the CPU 11, the CPU 21, the CPU 31 and the GPU 39 may be executed by hardware such as an application specific integrated circuit (ASIC) or a field-programmable gate array (FPGA).

The user terminal 10, the service administrator terminal 20, and the concealed information processing server 30 may be implemented as a computer system including a plurality of computers configured logically or physically. In addition, the user terminal 10, the service administrator terminal 20, and the concealed information processing server 30 may be implemented as separate threads on the same computer, or may be implemented as a plurality of virtual computers constructed using physical computer resources.

In the present embodiment, the information used by the concealed information processing system 1 may be expressed by any data structure without depending on the data structure. For example, a data structure appropriately selected from list, table, database, or queue can store the information.

(1-2) Example of Flow of Providing Concealed Information Processing Service by Concealed Information Processing System FIG. 3 is a sequence diagram illustrating an example of a flow of providing a concealed information processing service in the concealed information processing system 1 according to Embodiment 1.

First, the concealed information processing service provided by the concealed information processing system 1 according to the present embodiment will be described. The concealed information processing service is a service for providing a service user with an information processing function that uses the concealed information processing server 30 on a cloud and that is advanced and has ensured security, due to the construction and operation management of the concealed information processing server 30 by the service administrator.

The value provided by the concealed information processing service is to allow the service user to use inexpensive and highly functional computer resources on the cloud while keeping the confidential information concealed. By using the concealed information processing service, the service user does not need to purchase expensive resources such as a computer and software, or perform environment construction or management, in the customer site. Accordingly, the result of advanced information processing such as AI learning and AI inference can be obtained without disclosing confidential information to the cloud administrator or the service administrator.

Hereinafter, an example of a flow of providing the concealed information processing service will be described with reference to FIG. 3.

First, the service user operates the user terminal 10 to transmit an application for use of the concealed information processing service to the service administrator terminal 20 (step S301).

Next, the service administrator operates the service administrator terminal 20 to construct a service environment on the cloud (step S302).

Specifically, the service administrator uses the service administrator terminal 20 to construct the concealed information processing server 30, activate the concealed information processing service on the concealed information processing server 30, etc., where the cloud administrator is a privileged user in the data center of the cloud, and monitors an operation log or the like of the service administrator in the cloud. In addition, the service administrator analyzes the program for implementing the processing using the service administrator terminal 20, and embeds information indicating whether the encrypted data needs to be decrypted in the program. The above-described information may be added to each task included in the processing.

Next, the service administrator operates the service administrator terminal 20 to transmit a start notification of the concealed information processing service to the user terminal 10 (step S303).

Next, the service user operates the user terminal 10 to transmit, to the concealed information processing server 30, a request for issuance of a key for encrypting the confidential information to be transmitted to the concealed information processing server 30 (step S304).

When receiving the request for issuance, the concealed information processing server 30 generates a key pair of public key encryption in the confidence region 38 (step S305), holds the secret key of the key pair in the confidence region 38, and transmits the public key of the key pair to the user terminal 10 (step S306), where it is assumed that a secret key 331 and a public key 332 are generated.

Next, the service user operates the user terminal 10 to generate a common key used for encryption/decryption of the confidential information, the processing content, or the processing result (step S307), where it is assumed that a common key 301 is generated. The service user operates the user terminal 10 to use the common key to encrypt the confidential information included in the data to be processed by the concealed information processing service (step S308), and further encrypts the common key using the public key (step S309). The service user operates the user terminal 10 to transmit, to the concealed information processing server 30, a request for execution including the encrypted data and the encrypted common key (step S310).

The concealed information processing server 30 executes concealed information processing of decrypting the confidential information included in the received data in the confidence region 38 and performing information processing (step S311), and transmits a processing result encrypted using the common key to the user terminal 10 (step S312). The concealed information processing server 30 transmits an execution log or the like of the concealed information processing to the service administrator terminal 20 (step S313).

The service user operates the user terminal 10, decrypts the received processing result using the common key (step S314), and obtains the processing result of the concealed information processing on the data including the confidential information.

(1-3) Functional Configuration Example of Concealed Information Processing Server and Data Processing Example of Concealed CNN Processing FIG. 4 is a block diagram illustrating an example of a functional configuration of the concealed information processing server 30 according to Embodiment 1.

A functional configuration of the concealed information processing server 30 for executing concealed convolutional neural network (CNN) processing as an example of the concealed information processing will be described with reference to FIG. 4.

The concealed information processing server 30 includes, for example, a normal region 410 for performing normal high-speed processing by the CPU, the memory, and an acceleration chip such as a GPU, and the confidence region 38 that is generated by the TEE function, highly secure, and isolated.

The normal region 410 stores, for example, a network flow control unit 411, a determination unit 412, and parameter information 413. The network flow control unit 411 is a part of a machine learning process of a multilayer network structure such as CNN (hereinafter, CNN will be described as an example), and controls a data flow of input and output of the encrypted data based on the network relationship between the layers. The determination unit 412 determines the necessity of dividing the processing and determines the speed-up method based on the memory usage necessary for executing the processing, the size of the input/output data, the parameter information, and the like. The parameter information 413 includes the network configuration of the CNN such as the number of layers of the CNN and the type of calculation of each layer, the weights, and the like. The parameter information 413 is stored in the auxiliary storage device 33 of the concealed information processing server 30, and is read into the normal region 410 by the network flow control unit 411 when necessary.

The confidence region 38 stores, for example, a decryption unit 421, a preprocessing unit 422, a sub-processing unit 423, an encryption unit 424, the common key 301, and the secret key 331. The sub-processing unit 423 executes the processing of the layers of the CNN. The decryption unit 421 decrypts the common key 301 encrypted with the public key 332 using the secret key 331 stored in the confidence region 38, and stores the decrypted common key 301 in the confidence region 38. The encryption unit 424 encrypts the processing result output by the sub-processing unit 423 using the common key 301 stored in the confidence region 38.

FIG. 5 is a flowchart illustrating an example of concealed information processing executed by the concealed information processing server 30 according to Embodiment 1.

Hereinafter, an example of the concealed information processing (CNN processing) performed by the concealed information processing server 30 will be described with reference to FIG. 5.

When receiving the request for execution of the processing including the data encrypted using the common key and the common key 301 encrypted using the public key 332, the concealed information processing server 30 executes the concealed information processing described below.

When receiving the request for execution of the processing, the network flow control unit 411 of the concealed information processing server 30 initializes the value of each of a variable i, a variable j, and a variable b_num to 1 (step S501). The variables are used for the network flow control of the CNN used in the concealed CNN processing for the encrypted data. At this time, the network flow control unit 411 reads the parameter information 413 of the CNN used in the concealed CNN processing from the auxiliary storage device 33 and stores the parameter information 413 in the normal region 410. The network flow control unit 411 starts the processing of the network flow for performing the concealed CNN processing based on the parameter information 413.

Next, the network flow control unit 411 calls the determination unit 412. The determination unit 412 calculates a memory usage Si necessary for executing the processing of the i-th layer based on the parameters (related parameters) related to the processing of the i-th layer (block process) included in the parameter information 413 (step S502).

Next, the determination unit 412 determines whether the memory usage Si is equal to or less than an upper limit value Smax of the capacity of the confidence region 38 that can be processed without the occurrence of paging (step S503).

When the memory usage Si is equal to or less than the upper limit value Smax, the determination unit 412 determines a speed-up method suitable for executing the processing of the i-th layer based on the related parameters of the processing of the i-th layer, and generates the decryption unit 421, the preprocessing unit 422, the sub-processing unit 423 for performing the processing of the i-th layer, and the encryption unit 424 in the confidence region 38 as an enclave, which is a process to be executed in isolation (step S504). In addition, the determination unit 412 inputs the related parameters of the i-th layer and the input data for the i-th layer to the enclave. The determination unit 412 waits for a response from the enclave.

For example, when the input data used in the i-th layer is large, the determination unit 412 employs a method of dividing the input data to speed up the processing of the i-th layer.

Next, the decryption unit 421 decrypts the encrypted common key using the secret key 331, and decrypts the encrypted data using the decrypted common key (step S505).

Next, based on the related parameters of the processing of the i-th layer and the decrypted data, the preprocessing unit 422 executes preprocessing by division, shaping, and the like for multithreading of data processing effective for high-speed execution of the processing of the i-th layer (step S506).

Next, the sub-processing unit 423 executes the processing of the i-th layer using the related parameters of the i-th layer and the preprocessed data (step S507). Specifically, the processing of each layer constituting the CNN (such as convolution, pooling, and dense) is executed.

Next, the encryption unit 424 encrypts the parameter information or data as the processing result of step S507 using the decrypted common key 301, and outputs the encrypted parameter information or data to the determination unit 412 (step S508).

Next, the determination unit 412 deletes the enclave from the confidence region 38 (step S509), and then proceeds to step S520. By deleting the enclave, it is possible to secure the capacity of the confidence region 38 to be used by another processing.

In step S503, when the memory usage Si is larger than the upper limit value Smax, the determination unit 412 calculates the number of divisions and sets the number of divisions to the variable b_num (step S510), where the number of divisions is a number of piece processes such that the memory usage is smaller than the capacity of the confidence region 38 and paging does not occur.

For example, the number of divisions is calculated using Equation (1). ceiling( ) represents an operation of calculating a natural number by rounding up after the decimal point.
[Formula 1]

Next, the determination unit 412 divides the related parameters and the input data of the i-th layer into b_num parts (step S511). That is, the processing of the i-th layer is divided into b_num piece processes.

Next, the determination unit 412 determines a speed-up method suitable for executing the j-th piece process based on the related parameters of the i-th layer, and generates an enclave in the confidence region 38 (step S512). In addition, the determination unit 412 inputs the related parameters of the i-th layer and the input data for the i-th layer to the enclave. The determination unit 412 waits for a response from the enclave. The processing of step S512 is the same as the processing of step S504.

Next, the decryption unit 421 decrypts the encrypted common key 301 using the secret key 331, and decrypts the encrypted data using the decrypted common key 301 (step S513). The processing of step S513 is the same as the processing of step S505.

Next, the preprocessing unit 422 executes the preprocessing based on the related parameters of the i-th layer and the decrypted data (step S514). The processing of step S514 is the same as the processing of step S506.

Next, the sub-processing unit 423 executes the piece process using the related parameters of the j-th piece process and the preprocessed data (step S515). In the piece process, the processing is performed using parameters and data divided or shaped so as not to exceed Smax, which allows processing without generating a paging process. Accordingly, it is possible to prevent an increase in processing time due to the occurrence of a paging process.

Next, the encryption unit 424 encrypts the parameter information or data as the processing result of step S515 using the decrypted common key 301, and outputs the encrypted parameter information or data to the determination unit 412 (step S516). The processing of step S516 is the same as the processing of step S508.

Next, the determination unit 412 deletes the enclave from the confidence region 38 (step S517). The processing of step S517 is the same as the processing of step S509.

Next, the determination unit 412 adds 1 to the value of the variable j (step S518), and determines whether the value of the variable j is smaller than the value of the variable b_num (step S519).

When the value of the variable j is smaller than the value of the variable b_num, the determination unit 412 returns to step S512 and performs the same process. When the value of the variable j is equal to or larger than the value of the variable b_num, the determination unit 412 proceeds to step S520.

In step S520, the determination unit 412 calls the network flow control unit 411. The network flow control unit 411 adds 1 to the value of the variable i (step S520). The network flow control unit 411 determines whether the i-th layer exists (step S521).

When the i-th layer exists, the network flow control unit 411 returns to step S502 and calls the determination unit 412. When the i-th layer does not exist, the network flow control unit 411 ends the concealed information processing. When there are a plurality of encrypted processing results, the network flow control unit 411 aggregates the plurality of processing results to generate one processing result.

In FIG. 5, the processing of all the layers of the CNN need decryption, but the processing of at least one layer of the CNN may not need decryption. In this case, in step S502, the determination unit 412 determines whether the block process needs decryption. When not needing decryption, the determination unit 412 generates the preprocessing unit 422 and the sub-processing unit 423 in the normal region 410 as an enclave, executes the preprocessing and the i-th processing, and then deletes the enclave. When the normal region 410 is used, the processing is not divided into piece processes. In this way, it is possible to ensure the security and speed up by controlling the process while dividing one process into processes of smaller units.

(1-4) Effects of Embodiment 1

As described above, for processing including a plurality of block processes, the concealed information processing server 30 can prevent the occurrence of a paging process by executing the processing in units of block process using the confidence region 38. In addition, the concealed information processing server 30 can prevent the occurrence of a paging process by dividing the block processes into finer piece processes and executing the processing in units of piece process using the confidence region 38. That is, according to the present embodiment, it is possible to prevent the occurrence of a paging process even if the size, the parameter information, and the amount of data to be handled of an application (for example, a machine learning application of several 100 MB, a multilayer CNN model of several 100 MB to several GB, or the like) exceed the confidence region. Accordingly, it is possible to prevent an increase in processing time while ensuring the security.

Embodiment 2

Embodiment 2 is different from Embodiment 1 in that the concealed information processing is performed using a plurality of concealed information processing servers 30. Hereinafter, Embodiment 2 will be described focusing on differences from Embodiment 1.

(2-1) Configuration of Concealed Information Processing System

The system configuration of the concealed information processing system 1 according to Embodiment 2 is the same as that according to Embodiment 1. A hardware configuration example of each of the user terminal 10, the service administrator terminal 20, and the concealed information processing server 30 according to Embodiment 2 is the same as that according to Embodiment 1. The functional configuration of the concealed information processing server 30 according to Embodiment 2 is the same as that according to Embodiment 1.

In Embodiment 2, the request for execution of the concealed information processing using the confidential information held by the user terminal 10 is transmitted to the plurality of concealed information processing servers 30. When receiving the request for execution, the plurality of concealed information processing servers 30 execute concealed information processing such as inference/learning using confidential information in parallel, and transmit the processing results to the user terminal 10. This can speed up the concealed information processing, and thus can enhance the value of the concealed information processing service.

(2-2) Flow of Providing Concealed Information Processing Service

FIGS. 6A and 6B are sequence diagrams illustrating an example of a flow of providing a concealed information processing service in the concealed information processing system 1 according to Embodiment 2.

Hereinafter, an example of a flow of providing the concealed information processing service according to Embodiment 2 will be described with reference to FIG. 6. In the description with reference to FIG. 6, the description of the same processing as that according to Embodiment 1 will be omitted, and the differences will be mainly described.

First, the service user operates the user terminal 10 to transmit an application for use of the concealed information processing service to the service administrator terminal 20 (step S301).

Next, the service administrator operates the service administrator terminal 20 to construct a service environment on the cloud (step S302), where three concealed information processing servers 30-1, 30-2, and 30-3 are constructed, and the concealed information processing service is activated. When not to be distinguished, the concealed information processing servers 30-1, 30-2, and 30-3 are referred to as the concealed information processing server 30.

Next, the service administrator operates the service administrator terminal 20 to transmit a start notification of the concealed information processing service to the user terminal 10 (step S303).

Next, the service user operates the user terminal 10 to transmit, to one concealed information processing server 30, a request for issuance of a key for encrypting the confidential information to be transmitted to the concealed information processing server 30 (step S304). The transmission target is notified by the service administrator, where it is assumed that the request is transmitted to the concealed information processing server 30-1.

When receiving the request for issuance of the key from the user terminal 10, the concealed information processing server 30 transmits a request for issuance of the key to another concealed information processing server 30 (step S351), where the concealed information processing 30-1 transmits a request for issuance of the key to the two concealed information processing servers 30-2 and 30-3.

The concealed information processing server 30 that receives the request for issuance of the key from another concealed information processing server 30 generates a key pair of public key encryption in the confidence region 38 (step S352), holds the secret key of the key pair in the confidence region 38, and transmits the public key of the key pair to the concealed information processing server 30 (step S353), where it is assumed that the concealed information processing server 30-2 generates a secret key 341 and a public key 342, and the concealed information processing server 30-3 generates a secret key 351 and a public key 352.

The concealed information processing server 30 that receives the request for issuance of the key from the user terminal 10 generates a key pair of public key encryption in the confidence region 38 (step S305), holds the secret key of the key pair in the confidence region 38, and transmits the public key of the key pair to the user terminal 10 (step S306), where it is assumed that the secret key 331 and the public key 332 are generated.

Next, the service user operates the user terminal 10 to generate a common key used for encryption/decryption of the confidential information, the processing content, or the processing result (step S307), where it is assumed that a common key 301 is generated. The service user operates the user terminal 10 to use the common key to encrypt the confidential information included in the data to be processed by the concealed information processing service (step S308), and further encrypts the common key using the public key (step S309). The service user operates the user terminal 10 to transmit, to the concealed information processing server 30 that transmits the public key, a request for execution including the encrypted data and the encrypted common key (step S310), where the request for execution is transmitted to the concealed information processing server 30-1.

The concealed information processing server 30 that receives the request for execution from the user terminal 10 executes the concealed information processing in cooperation with the other concealed information processing server 30 (step S354).

When the concealed information processing is concealed CNN processing, the processing flow described in FIG. 5 is partially different. Specifically, the following (process 1) to (process 3) are repeatedly executed after the process of step S511.

(Process 1)

The concealed information processing server 30-1 generates a common key 343 used for encryption in the (j+1)-th piece process and a common key 353 used for encryption in the (j+2)-th piece process. The concealed information processing server 30-1 encrypts the input data of the (j+1)-th piece process using the common key 343, and encrypts the common key 343 using the public key 342. The concealed information processing server 30-1 transmits the encrypted input data and the encrypted common key 343 to the concealed information processing server 30-2. The concealed information processing server 30-1 encrypts the input data of the (j+2)-th piece process using the common key 353, and encrypts the common key 353 using the public key 352. The concealed information processing server 30-1 transmits the encrypted input data and the encrypted common key 353 to the concealed information processing server 30-3.

(Process 2)

The concealed information processing server 30-2 decrypts the common key 343 using the secret key 341 and decrypts the input data using the common key 343 in the confidence region 38. The concealed information processing server 30-2 executes the (j+1)-th piece process using the input data or the like, encrypts the processing result using the common key 343, and transmits the encrypted processing result to the concealed information processing server 30-1. The flow of the processing is the same as the flow of the processing from step S512 to step S517.

(Process 3)

The concealed information processing server 30-3 decrypts the common key 353 using the secret key 351 and decrypts the input data using the common key 353 in the confidence region 38. The concealed information processing server 30-3 executes the (j+2)-th piece process using the input data or the like, encrypts the processing result using the common key 353, and transmits the encrypted processing result to the concealed information processing server 30-1. The flow of the processing is the same as the flow of the processing from step S512 to step S517.

When receiving the encrypted processing result from the concealed information processing servers 30-2 and 30-3, the concealed information processing server 30-1 decrypts the encrypted processing result using the common keys 343 and 353. In parallel with (Process 1), the concealed information processing server 30-1 executes the processes from step S512 to step S517 for the j-th piece process. In step S518, the concealed information processing server 30-1 adds 3 to the value of the variable j. The concealed information processing server 30 aggregates the results of the piece processes or the block processes executed in parallel. Return to the description of FIG. 6B.

Next, the encryption unit 424 of the concealed information processing server 30 that receives the request for execution from the user terminal 10 transmits, to the user terminal 10, the processing result encrypted using the common key received from the user terminal 10 (step S312). Further, each concealed information processing server 30 transmits the execution log or the like in the concealed information processing to the service administrator terminal 20 (step S313).

Finally, the service user operates the user terminal 10, decrypts the processing result using the common key (step S314), and obtains the processing result of the concealed information processing on the data including the confidential information.

(2-3) Effects of Embodiment 2

As described above, in the concealed information processing system 1 according to Embodiment 2, the concealed information processing is executed by using the plurality of concealed information processing servers 30, which can speed up the concealed information processing. Accordingly, the response time of the service can be shortened.

Embodiment 3

Embodiment 3 is different from Embodiment 1 and Embodiment 2 in that the concealed information processing server 30 is arranged in a plurality of regions. Hereinafter, Embodiment 3 will be described focusing on differences from Embodiment 1 and Embodiment 2.

(3-1) Configuration of Concealed Information Processing System

FIG. 7 is a block diagram illustrating a system configuration example of a concealed information processing service according to Embodiment 3. In Embodiment 3, the concealed information processing server 30 and the user terminal 10 exist in a plurality of regions 700-1, 700-2, and 700-3. In the following description, when not to be distinguished, the regions 700-1, 700-2, and 700-3 are referred to as regions 700, where each region 700 represents an organization such as a country, a region, or a company.

The data holder in each region 700 holds confidential information that can be handled only in the region 700. It is also assumed that a service administrator exists in at least one region 700.

A hardware configuration example of each of the user terminal 10, the service administrator terminal 20, and the concealed information processing server 30 according to Embodiment 3 is the same as that according to Embodiment 1. The functional configuration of the concealed information processing server 30 according to Embodiment 3 is the same as that according to Embodiment 1.

In the concealed information processing service according to Embodiment 3, when receiving an application for use of the service from the user terminal 10 in any region 700, the service administrator constructs the concealed information processing server 30 in each region 700, causes the concealed information processing server 30 in each region 700 to execute concealed information processing using the confidential information in the region, aggregates the processing results of the regions 700, and provides the service user with the processing results.

(3-2) Flow of Providing Concealed Information Processing Service

FIGS. 8A and 8B are sequence diagrams illustrating an example of a flow of providing the concealed information processing service in the concealed information processing system 1 according to Embodiment 3.

Hereinafter, an example of a flow of providing the concealed information processing service according to Embodiment 3 will be described with reference to FIG. 8. In the description with reference to FIG. 8, the description of the same contents as those according to Embodiment 1 and Embodiment 2 will be omitted, and the differences will be mainly described.

The service user in each region 700 operates the user terminal 10 to transmit an application for use of the concealed information processing service to the service administrator terminal 20 of the service administrator (step S301).

Next, the service administrator operates the service administrator terminal 20 to construct a service environment on the cloud of each region 700 (step S302).

Next, the service administrator operates the service administrator terminal 20 to transmit a service start notification of the concealed information processing service to the user terminal 10 in each region 700 (step S303).

The processing from step S304 to step S310 is executed between the user terminal 10 and the concealed information processing server 30 in each region 700. A secret key 331, a public key 332, and a common key 301 are generated in a region 700-1; a secret key 651, a public key 652, and a common key 601 are generated in a region 700-2; and a secret key 751, a public key 752, and a common key 701 are generated in a region 700-3.

The service user in any region 700 operates the user terminal 10 to transmit a request for aggregation of the concealed information processing in each region 700 to the concealed information processing server 30 (step S361).

The concealed information processing server 30 transmits a request for issuance of the key for encrypting the request for aggregation to the concealed information processing server 30 in a region 700 other than the region 700 in which the user terminal 10 making the request for aggregation exists (step S362).

The concealed information processing server 30 that receives the request for issuance of the key generates a key pair of public key encryption in the confidence region 38 (step S363), holds the secret key of the key pair in the confidence region 38, and transmits the public key of the key pair to the concealed information processing server 30 that transmits the request for issuance of the key (step S364), where it is assumed that the concealed information processing server 30 in the region 700-2 generates a secret key 661 and a public key 662, and the concealed information processing server 30 in the region 700-3 generates a secret key 761 and a public key 762.

When receiving the request for aggregation, the concealed information processing server 30 generates a common key used for encryption/decryption of confidential data, processing request contents, or processing results (step S365), where a common key 343 is generated. The concealed information processing server 30 encrypts the processing content and the input information to be transmitted to each region 700 using the common key (step S366), and encrypts the common key using the public key received from the concealed information processing server 30 of each region 700 (step S367), where the common key 343 is encrypted using each of the public key 662 and the public key 762.

The concealed information processing server 30 that receives the request for aggregation transmits a request for execution including the encrypted processing content and the encrypted common key to the concealed information processing server 30 in each region 700 (step S368).

In each confidence region 38, the concealed information processing server 30 that receives the request for execution decrypts the encrypted processing content and the common key using the secret key generated in step S363, decrypts the data received from the user terminal 10 using the secret key generated in step S305, and executes the concealed information processing (step S369). The concealed information processing server 30 encrypts the processing result using the common key and transmits the encrypted processing result to the concealed information processing server 30 that transmits the request for execution (step S370).

The concealed information processing server 30 that receives the request for aggregation decrypts the encrypted processing result using the common key generated in step S364, performs aggregation by totalizing, analyzing, and performing machine learning or the like on the plurality of processing results based on the content of the concealed aggregation processing request, and encrypts the aggregation result using the common key generated in step S307 (step S371), where the decryption is performed using the common key 343, and the encryption is performed using the common key 301. The concealed information processing server 30 transmits the aggregation result to the user terminal 10 that transmits the request for aggregation (step S372).

The user terminal 10 that receives the aggregation result decrypts the received aggregation result using the common key, and presents the aggregation result to the service user through screen display or the like (step S370), where the decryption is performed using the common key 301.

(3-3) Effects of Embodiment 3

As described above, in the concealed information processing system 1 according to Embodiment 3, the concealed information processing server 30 of each region executes the concealed information processing using the confidential information held by the user terminal 10 in the region, and the concealed information processing server 30 of one region aggregates the processing result of each region into one region and transmits the processing result to the user terminal 10. Accordingly, it is possible to provide the service user with the result of the processing using the confidential information that cannot be moved to the outside of the region under the legal regulation of each region or the rules of the company.

In addition, in the concealed information processing system 1 described in Embodiment 1 to Embodiment 3, the concealed information processing server 30 performs the processing by decrypting the confidential information encrypted and the content of the request for the process only in the confidence region 38. Therefore, the content of the confidential information and the request for the processing can be concealed from the service administrator, the cloud administrator, and the other data holders.

As described above, the concealed information processing system 1 described in the Embodiment 1 to Embodiment 3 can provide the service user with a concealed information processing service that can perform, at a high speed, concealed information processing in which data held by a plurality of service users are combined while keeping the confidential information concealed from the service administrator and the cloud administrator.

The invention is not limited to the above-described embodiments, and includes various modifications and equivalent configurations within the scope of the appended claims. For example, the above-described embodiment is described in detail for easy understanding of the invention, and the invention is not necessarily limited to those including all the configurations described above. Another configuration may be added to a part of the configuration of an embodiment, and a part of the configuration of each embodiment may be deleted or replaced with another configuration.

A part or all of the above-described configurations, functions, processing units, processing methods, and the like may be implemented by hardware by, for example, designing with an integrated circuit, or may be implemented by software by, for example, a processor interpreting and executing a program for implementing each function.

Some or all of the configurations, functions, processing units, processing methods, and the like described above may be implemented by hardware by, for example, designing with an integrated circuit. The invention can also be implemented by a program code of software for implementing the functions in the embodiments. In this case, a storage medium storing the program code is provided to a computer, and a processor provided in the computer reads the program code stored in the storage medium. In this case, the program code read from the storage medium implements the functions of the embodiments described above by itself, and the program code itself and the storage medium storing the program code constitute the invention. Examples of the storage medium for supplying such a program code include a flexible disk, a CD-ROM, a DVD-ROM, a hard disk, a solid state drive (SSD), an optical disk, a magneto-optical disk, a CD-R, a magnetic tape, a non-volatile memory card, and a ROM.

Further, the program code for implementing the functions described in the present embodiment can be implemented in a wide range of programs or script languages such as assembler, C/C++, Perl, Shell, PHP, Python, and Java.

Further, the program code of the software for implementing the functions in the embodiments may be distributed via a network to be stored in a storage unit such as a hard disk or a memory of a computer or a storage medium such as a CD-RW or a CD-R, and a processor provided in the computer may read and execute the program code stored in the storage unit or the storage medium.

Control lines and information lines considered to be necessary for description are illustrated in the embodiments described above, and not all control lines and information lines in a product are necessarily illustrated. All the components may be connected to each other.

In addition to personal information, the present invention can also achieve the same effect in a case where confidential information that is highly confidential and limited from disclosure to the outside under in-house rules or the like, such as trade secrets, is to be provided to an external organization or the like while being concealed.

The present invention can improve the processing efficiency of advanced deep learning or the like in a plurality of organizations that handle personal information such as customer information and medical information and confidential information such as trade secrets while keeping the personal information and the trade secret information concealed, and thus can be widely applied to information processing systems for public/private services that cooperate with various kinds of confidential information.

The invention claimed is:

1. A computer system comprising at least one computer, wherein
the at least one computer has a processor, a memory connected to the processor, and a network interface connected to the processor,
the processor has a function for setting a confidence region in a memory, the confidence region having ensured security and being logically isolated,
the at least one computer
accepts a request for execution of processing on encrypted data, in which data is encrypted that includes a plurality of block processes and also includes confidential information,
determines whether the encrypted data needs to be decrypted in one of the block processes when executing the block process, and
executes the block process using a region that is different from the confidence region when the encrypted data does not need to be decrypted in the block process, or
executes the block process using the confidence region when the encrypted data needs to be decrypted in the block process.

2. The computer system according to claim 1, wherein the at least one computer
compares a memory usage required for executing one of the block processes with a capacity of the confidence region when the encrypted data needs to be decrypted, to determine whether a paging process occurs based on a result of the comparison,
divides the block process into a plurality of piece processes when a paging process occurs, and
sequentially executes each of the plurality of piece processes using the confidence region.

3. The computer system according to claim 2, wherein the at least one computer deletes data stored in the confidence region when one of the block processes in which a paging process does not occur or one of the piece processes is completed.

4. The computer system according to claim 2, wherein the at least one computer
encrypts a result of the processing, and
outputs the encrypted result of the processing.

5. The computer system according to claim 2, comprising:
a plurality of computers, wherein
one of the computers allocates at least one of the block processes to another one of the computers and causes the corresponding another one of the computers to execute the block process.

6. The computer system according to claim 5, wherein the plurality of computers are dispersed in a plurality of regions, respectively, and
the computer allocated with the block process executes the block process using the encrypted data that can be acquired in the region in which the computer exists.

7. The computer system according to claim 6, wherein
the computer aggregates a result of the plurality of block processes and outputs the result as a result of the processing.

8. The computer system according to claim 1, further comprising:
a management terminal, wherein
the management terminal
analyzes a program for implementing the processing, and
embeds information for specifying the block process requiring decryption of the encrypted data in the program based on a result of the analysis and provides the program to a user.

9. An information processing method executed by a computer system, wherein
the computer system includes at least one computer,
the at least one computer has a processor, a memory connected to the processor, and a network interface connected to the processor,
the processor has a function for setting a confidence region in a memory, the confidence region having ensured security and being logically isolated, and
the information processing method comprises:
a first step of the at least one computer accepting a request for execution of processing on encrypted data, in which data is encrypted that includes a plurality of block processes and also includes confidential information;
a second step of the at least one computer determining whether the encrypted data needs to be decrypted in one of the block processes when executing the block process; and
a third step of the at least one computer executing the block process using a region that is different from the confidence region when the encrypted data does not need to be decrypted in the block process; and
a fourth step of the at least one computer executing the block process using the confidence region when the encrypted data needs to be decrypted in the block process.

10. The information processing method according to claim 9, wherein
the fourth step includes:
a fifth step of the at least one computer comparing a memory usage required for executing one of the block processes with a capacity of the confidence region to determine whether a paging process occurs based on a result of the comparison;
a sixth step of the at least one computer dividing the block process into a plurality of piece processes when a paging process occurs; and
a seventh step of the at least one computer sequentially executing each of the plurality of piece processes using the confidence region.

11. The information processing method according to claim 10, wherein
the fourth step includes a step of the at least one computer deleting data stored in the confidence region when one of the block processes in which a paging process does not occur is completed, and
the seventh step includes a step of the at least one computer deleting the data stored in the confidence region when one of the piece processes is completed.

12. The information processing method according to claim 10, wherein
the computer system includes a plurality of computers, and
the information processing method includes a step of one of the computers allocating at least one of the block processes to another one of the computers and causing the corresponding another one of the computers to execute the block process.

13. The information processing method according to claim 12, wherein
the plurality of computers are dispersed in a plurality of regions, respectively and
the information processing method includes a step of the computer allocated with the block process executing the block process using the encrypted data that can be acquired in the region in which the computer exists.

14. The information processing method according to claim 13, wherein
the information processing method includes a step of the computer aggregating a result of the plurality of block processes and outputting the result as a result of the processing.

15. The information processing method according to claim 9, wherein
the computer system further includes a management terminal, and
the information processing method includes:
a step of the management terminal analyzing a program for implementing the processing; and
a step of the management terminal embedding information for specifying the block process requiring decryption of the encrypted data in the program based on a result of the analysis and provides the program to a user.

* * * * *